United States Patent
Sawdy (10) Patent No.: US 7,641,257 B2
(45) Date of Patent: Jan. 5, 2010

(54) SEATING ARRANGEMENT

(75) Inventor: Michael Sawdy, Hertford (GB)

(73) Assignee: NMI Safety Systems Ltd., London (GB)

( * ) Notice: Subject to any disclaimer, the term of this patent is extended or adjusted under 35 U.S.C. 154(b) by 227 days.

(21) Appl. No.: 11/467,554

(22) Filed: Aug. 26, 2006

(65) Prior Publication Data

US 2007/0063557 A1 Mar. 22, 2007

(30) Foreign Application Priority Data

Sep. 22, 2005 (GB) .................. 0519388.3

(51) Int. Cl.
*B60N 2/00* (2006.01)

(52) U.S. Cl. .................. 296/64; 296/65.01; 296/65.03; 248/349.1; 248/415; 297/344.1

(58) Field of Classification Search .................. 296/64, 296/65.01, 65.03, 65.04, 65.05, 65.09, 66; 248/349.1, 131, 186.1, 415; 297/14, 15, 297/484, 493, 383, 344.1, 216.1, 337, 354.12
See application file for complete search history.

(56) References Cited

U.S. PATENT DOCUMENTS

| | | | | | |
|---|---|---|---|---|---|
| 5,120,103 | A | * | 6/1992 | Kave | .......................... 296/19 |
| 6,106,066 | A | * | 8/2000 | Moffa et al. | ................ 297/332 |
| 6,113,325 | A | * | 9/2000 | Craft | ............................ 410/7 |
| 6,149,528 | A | * | 11/2000 | Volz et al. | ...................... 472/43 |
| 6,669,261 | B2 | * | 12/2003 | Roberts et al. | ........... 296/65.09 |
| 2001/0032916 | A1 | * | 10/2001 | Wess et al. | ............... 248/349.1 |
| 2002/0153740 | A1 | | 10/2002 | Miyahara et al. | |
| 2004/0005203 | A1 | | 1/2004 | Craft | |
| 2004/0189077 | A1 | | 9/2004 | Moffa et al. | |
| 2006/0159542 | A1 | * | 7/2006 | Ditch | ............................ 410/7 |
| 2006/0266582 | A1 | * | 11/2006 | Eckerdt | ..................... 182/100 |

FOREIGN PATENT DOCUMENTS

| | | |
|---|---|---|
| GB | 2176154 | 12/1986 |
| JP | 2001334856 | 12/2001 |
| WO | WO 2004/041586 | 5/2004 |

* cited by examiner

*Primary Examiner*—Lori L Lyjak
(74) *Attorney, Agent, or Firm*—Egbert Law Offices PLLC (57) ABSTRACT

A seating arrangement is provided in a vehicle to enable a wheelchair occupier to be carried safely in the vehicle, whilst having only a minimal effect on the total number of passengers that can be carried. The seating arrangement includes two adjacent seats, one adjacent the side of the vehicle and the other adjacent the aisle of the vehicle. The seat adjacent the side of the vehicle can be moved from a first position to a second position in which a clear space exists on the side of the second seat which is remote from the aisle. The second seat has a seat squab which is moveable to a position in which the seat squab does not obstruct the space in front of the back-rest of the seat, and the second seat is moveable laterally towards the side of the vehicle and axially of the vehicle.

13 Claims, 10 Drawing Sheets

SEATING ARRANGEMENT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a seating arrangement, and more particularly relates to a seating arrangement for use by able-bodied persons and by wheelchair occupiers.

In particular the invention relates to a seating arrangement for use in a transport vehicle such as a bus or coach.

2. Description of Related Art Including Information Disclosed Under 37 CFR 1.97 and 37 CFR 1.98

There is increasing a requirement for a public service transport vehicle such as a bus or coach to be able to accommodate a wheelchair user. In some jurisdictions, legislation is being enacted requiring all buses and coaches to be able to accommodate wheelchair occupiers.

It has been proposed to provide an arrangement in a public service vehicle, such as a bus or coach, in which anchorage points are provided mounted in the floor of the vehicle, to which a wheelchair may be secured. The anchorage points are provided in areas where normally seats are located. For the anchorage points to be used, the seats have to be removed completely, or, alternatively, the seats have to be moved rearwardly along rails upon which the seats are mounted in order to free-up the space where the anchorage points are provided. This means that the total number of passengers that can be carried within the bus or coach is substantially reduced when the anchorage points are in use to secure a wheelchair. Also, it is to be understood that simply providing anchorages to secure a wheelchair is, in many respects, far from ideal, especially as the wheelchair user will only be provided with minimal protection in the event that an accident should occur.

BRIEF SUMMARY OF THE INVENTION

The present invention seeks to provide an improved seating arrangement.

According to one aspect of this invention, there is provided a seating arrangement for a vehicle, the seating arrangement comprising two adjacent seats, one to be positioned adjacent a side of the vehicle, the other to be positioned adjacent the aisle of the vehicle. The seat adjacent the side of the vehicle is adapted to be moved from a first operative position to a second position in which a substantial clear space exists on the side of the second seat which is remote from the aisle. The second seat has a seat squab moveable to a position in which the seat squab does not obstruct the space in front of the back-rest of the seat. The seat is moveable laterally towards the side of the vehicle and axially of the vehicle.

The seating arrangement may be mounted in a vehicle in the form of a bus or coach.

Preferably the first seat is a seat which is removably mounted in position.

Conveniently the first seat is provided with a squab moveable to a position in which the squab does not obstruct the space in front of the back-rest. The back-rest is moveable laterally towards the side of the vehicle and is also mounted for rotational movement about a substantially vertical axis, to enable the back-rest to be located in position adjacent the side of the vehicle, and to define said substantial clear space. The substantial clear space is located between the back-rest of the first seat and the second seat.

Advantageously the squab of the second seat is removable from the back-rest of the second seat.

Preferably the back-rest of the second seat is provided with two safety-belts, each passing through a respective shoulder guide of the back-rest of the seat.

Conveniently the second seat is mounted on a platform, the platform being mounted on a transverse support plate to effect lateral movement, the transverse support plate being mounted on an axially extending support plate for axial movement.

Advantageously the platform is provided on its undersurface with two elongate shoes, the shoes being received within corresponding laterally extending grooves provided in the transverse support plate.

Preferably the transverse support plate is provided with axially extending shoes, the shoes being received within axially extending grooves provided in the support plate.

Conveniently the second seat is supported on a support plate, the support platform having at least one element engaging a groove and channel arrangement formed in a track unit, the grooves and channels defining at least one laterally extending groove and at least one axially extending channel, the element being slideably retained within the groove and channel to effect lateral and axial movement.

According to a further aspect of this invention, there is provided a seating arrangement, the seating arrangement comprising a seat, the seat having a squab and a back-rest, the squab being moveable to a position in which the squab does not obstruct the space in front of the back-rest, the seat being mounted for lateral movement and being mounted for axial movement.

Preferably the squab of the seat is removably mounted in position and may be removed from the back-rest so as to leave an unobstructed space in front of the back-rest.

Conveniently the seat is provided with two safety straps passing through shoulder guides provided on the back-rest of the seat.

Advantageously a winch is provided to winch a wheelchair into position adjacent the seat-back.

A seating arrangement may be mounted in a bus or coach.

According to a further aspect of this invention there is provided a turntable unit, the turntable unit comprising a housing, the housing incorporating a carriage for effecting lateral movement within the housing, the carriage supporting a turntable and a turntable surround, the turntable surround being associated with a roller-shutter to provide a simulated floor surface adjacent the turntable surround.

The turntable unit may be mounted in a bus or coach, the turntable unit being provided in conjunction with a seating arrangement for use by a wheelchair user.

The invention relates to a turntable unit in combination with a seating arrangement.

BRIEF DESCRIPTION OF THE SEVERAL VIEWS OF THE DRAWINGS

In order that the invention may be more readily understood, and so that further features thereof may be appreciated, the invention will now be described by way of example with reference to the accompanying drawings.

DETAILED DESCRIPTION OF THE INVENTION

Figure 1:
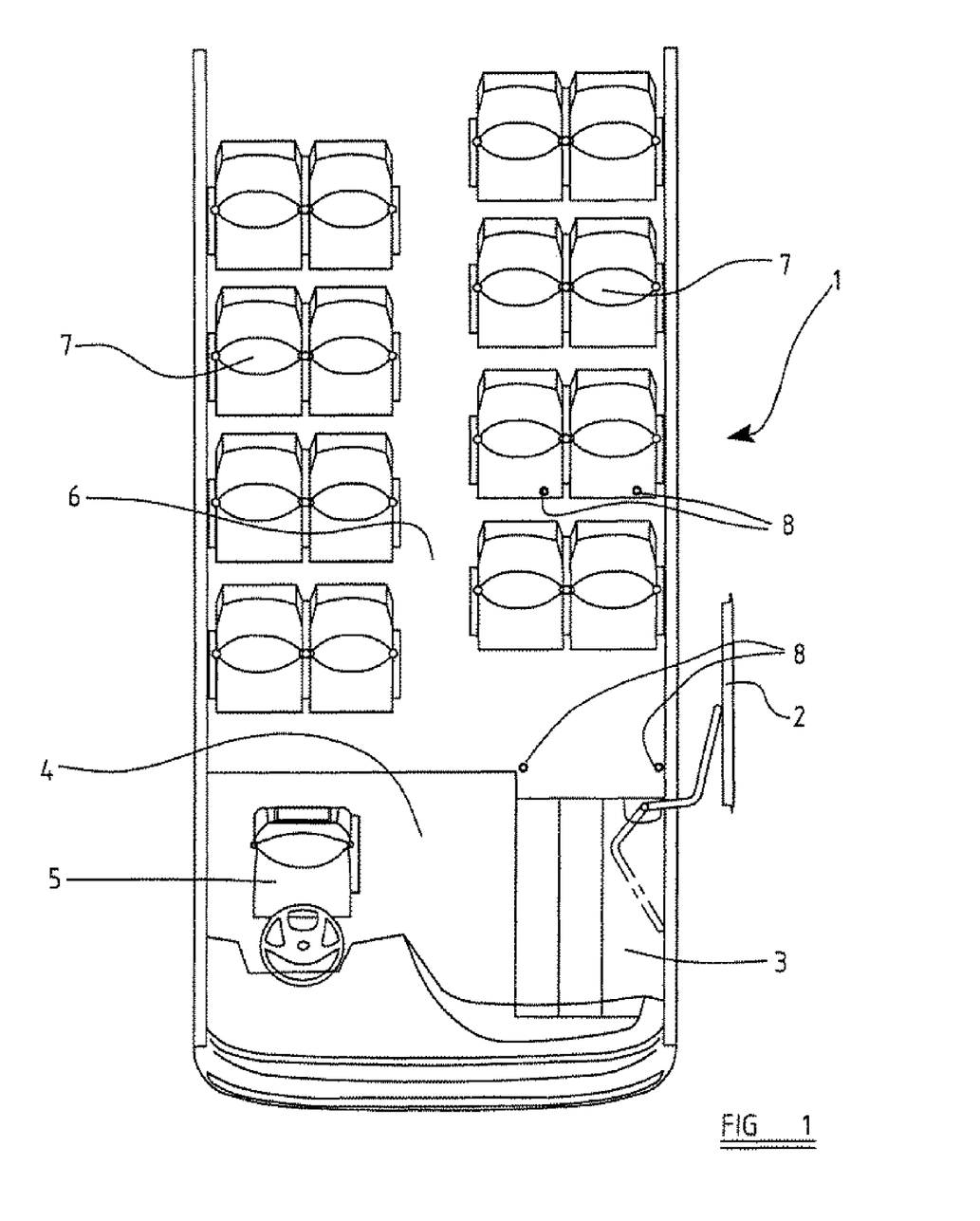
FIG. 1 is an upper perspective view of a diagram of part of a coach illustrating a prior art technique for securing a wheelchair in position.

Referring initially to FIG. 1, the front part of a coach is illustrated. The coach is provided with a remotely operable door to provide an access to a series of steps 3 leading up to a platform 4 located adjacent the driver's seat 5. The platform provides access to a central aisle 6, there being adjacent pairs of seats 7 located to either side of the aisle. Provided in the floor, on the near side of the vehicle, are four spaced-apart anchorage points 8, these anchorage points being anchorage points to which a wheelchair may be anchored. It can be seen that the rear-most anchorage points are located beneath the second row of seats. In order to provide access to all of the anchorage points, the seats of the second row of seats must be moved rearwardly until they touch the third row of seats and then the seats of the first row of seats must be moved rearwardly until they touch the second row of seats. The four anchorage points 8 are then accessible and a wheelchair may be located in the position initially occupied by the front row of seats on the near side of the vehicle. However, when the wheelchair is in position in this way, six "ordinary" seats can no longer be occupied. Also, the wheelchair is simply anchored in position, and no substantial protection is provided to the occupant of the wheelchair if an accident occurs.

It is to be understood that in a coach provided with the anchorage points, the steps 3 would be provided with a lift mechanism to lift a wheelchair from ground level to the level of the platform 4, and the platform 4 itself will be operable in the manner of a lift to raise the wheelchair occupant to the level of the aisle 6. By using the lifts, and by wheeling the wheelchair forward, with a final turn of the wheelchair so that it is facing "forward" within the bus or coach, the wheelchair can be positioned and anchored.

Figure 2:
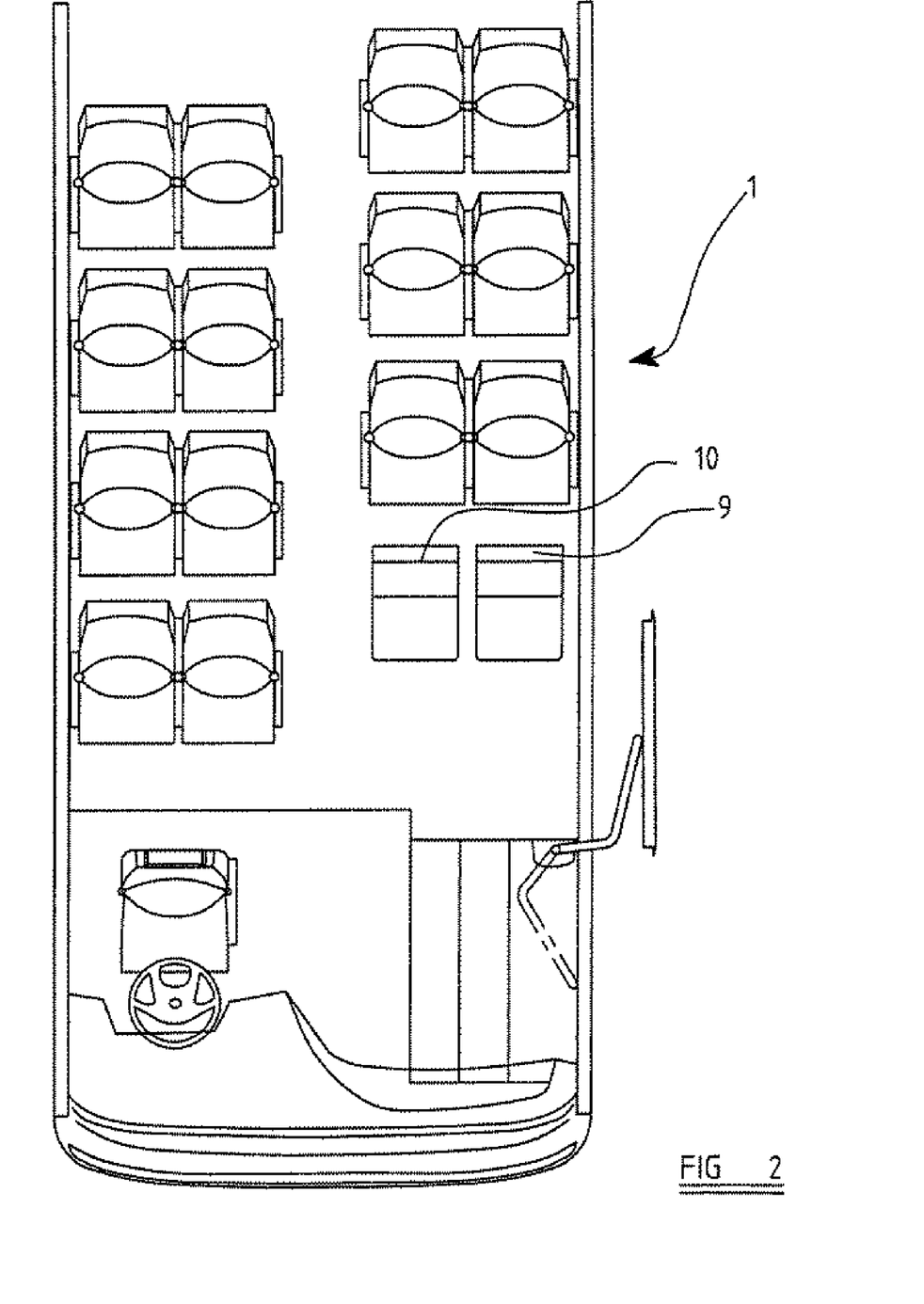
FIG. 2 is an upper perspective view, corresponding to FIG. 1, but illustrating a coach incorporating a seating arrangement in accordance with the present invention, showing the seats in one condition.

FIG. 2 illustrates a coach 1 having the features of the coach shown in FIG. 1, including the lift mechanism associated with the steps 3, and the platform 4 that is operable as a lift. However, in the coach illustrated in FIG. 1, two special seats 9, 10 are provided to form the front row of seats on the near side of the coach. These two seats will be described in detail below, but at this stage it is to be understood that the seats 9 and 10 are each of the type in which the squab of the seat may be removed, thus leaving a space in front of the back-rest of the seat totally unobstructed.

The seat 9, which is located adjacent the near side of the vehicle, is designed so that the back-rest of the seat may be rotated through 90° about a substantially vertical axis. The entire seat structure may be moved laterally towards the near side of the vehicle, so that the back-rest of the seat abuts against the side of the coach. The squab may be removed leaving a substantial clear space where the seat 9 was originally positioned.

The seat 10, which is located adjacent the aisle of the vehicle, is such that the squab may be removed and the seat may be moved laterally within the vehicle, so that the seat-back is then spaced inwardly from the aisle 6 of the bus. The seat-back may also move rearwardly from its initial position so that the seat-back may be moved to a position in which the seat-back abuts the seats in the second row of seats thus providing a very substantial space where the seat 10 was initially located. A wheelchair 11 may then be maneuvered into position in front of the seat-back 10, and the seat-back 10 may then be moved forward to engage the rear part of the wheelchair 11.

The wheelchair occupier may be strapped to the seat-back 10 to be protected by the seat-back 10 in a manner which will be described in more detail below.

Figure 3:
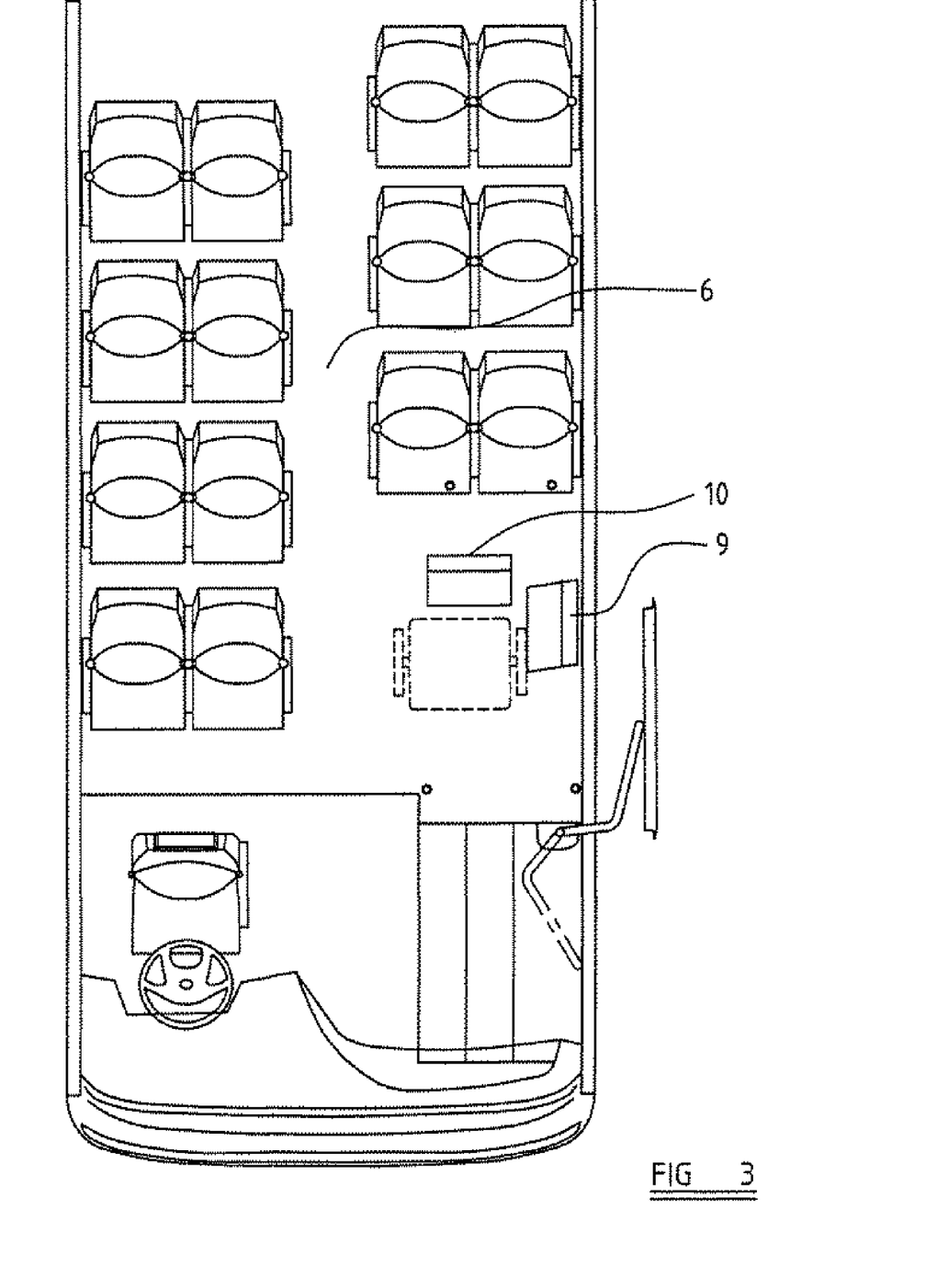
FIG. 3 is another upper perspective view, corresponding to FIG. 2, illustrating the coach with the seats of the seating arrangement in an alternative condition in which a wheelchair is accommodated.

Because the seat-back 10 is moved from its initial position towards the near side of the vehicle, the wheelchair 11 does not obstruct the aisle even though the wheelchair 11 is wider than the seat 10. Because the seat-back 10 is moved forward away from the seats of the second row of seats when the wheelchair is in position, the second row of seats may be occupied by able-bodied passengers. At this stage, therefore, it is to be appreciated that in utilizing a seating arrangement of this type, a wheelchair may be accommodated within a coach, with almost all of the seats of the coach still being occupied by able-bodied passengers. Indeed, in the coach illustrated in FIGS. 2 and 3 only one seat is "lost" when a wheelchair is carried on the coach.

Figure 4:
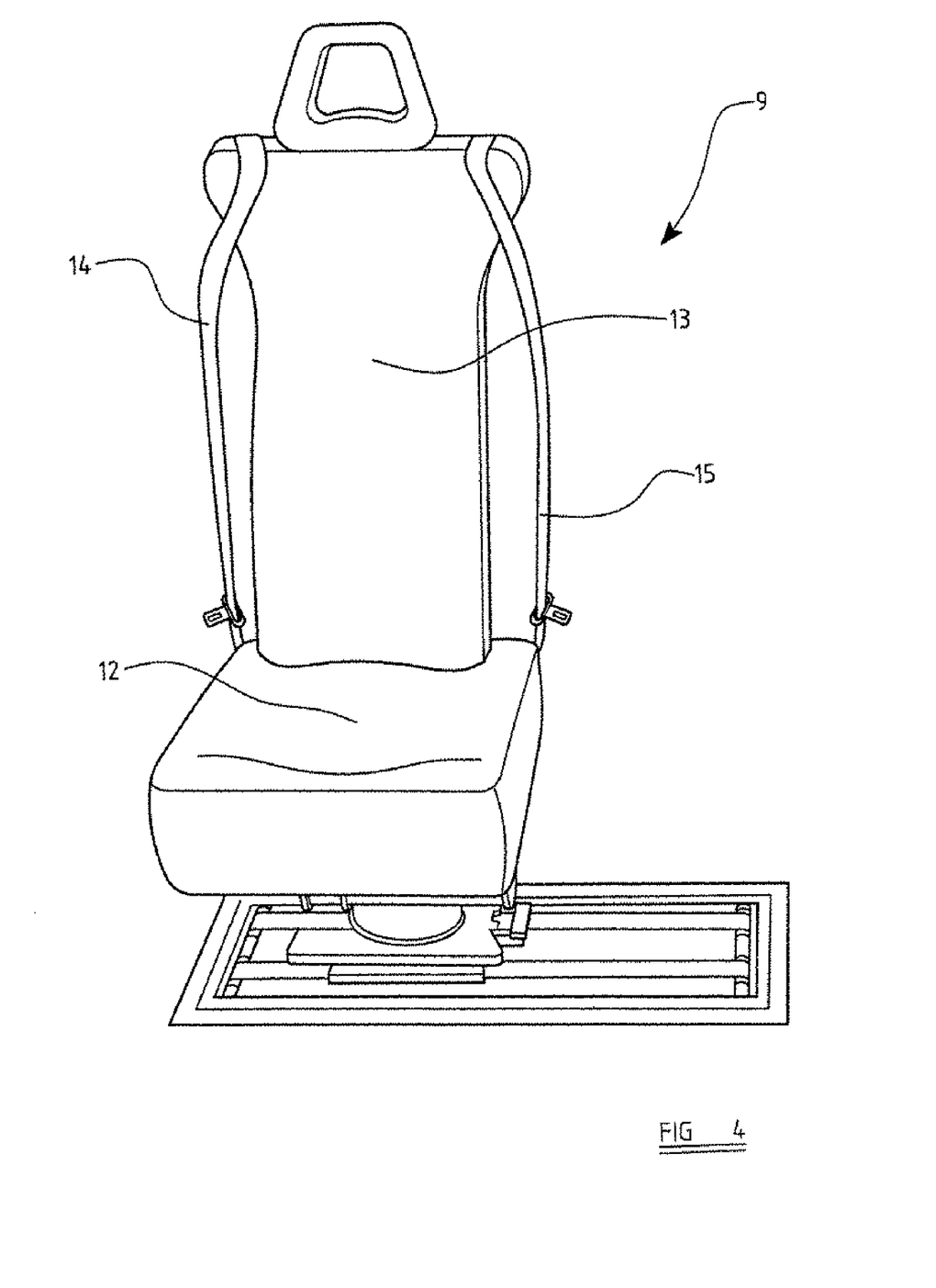
FIG. 4 is an enlarged front perspective view of one of the seats of the seating arrangement.
Figure 5:
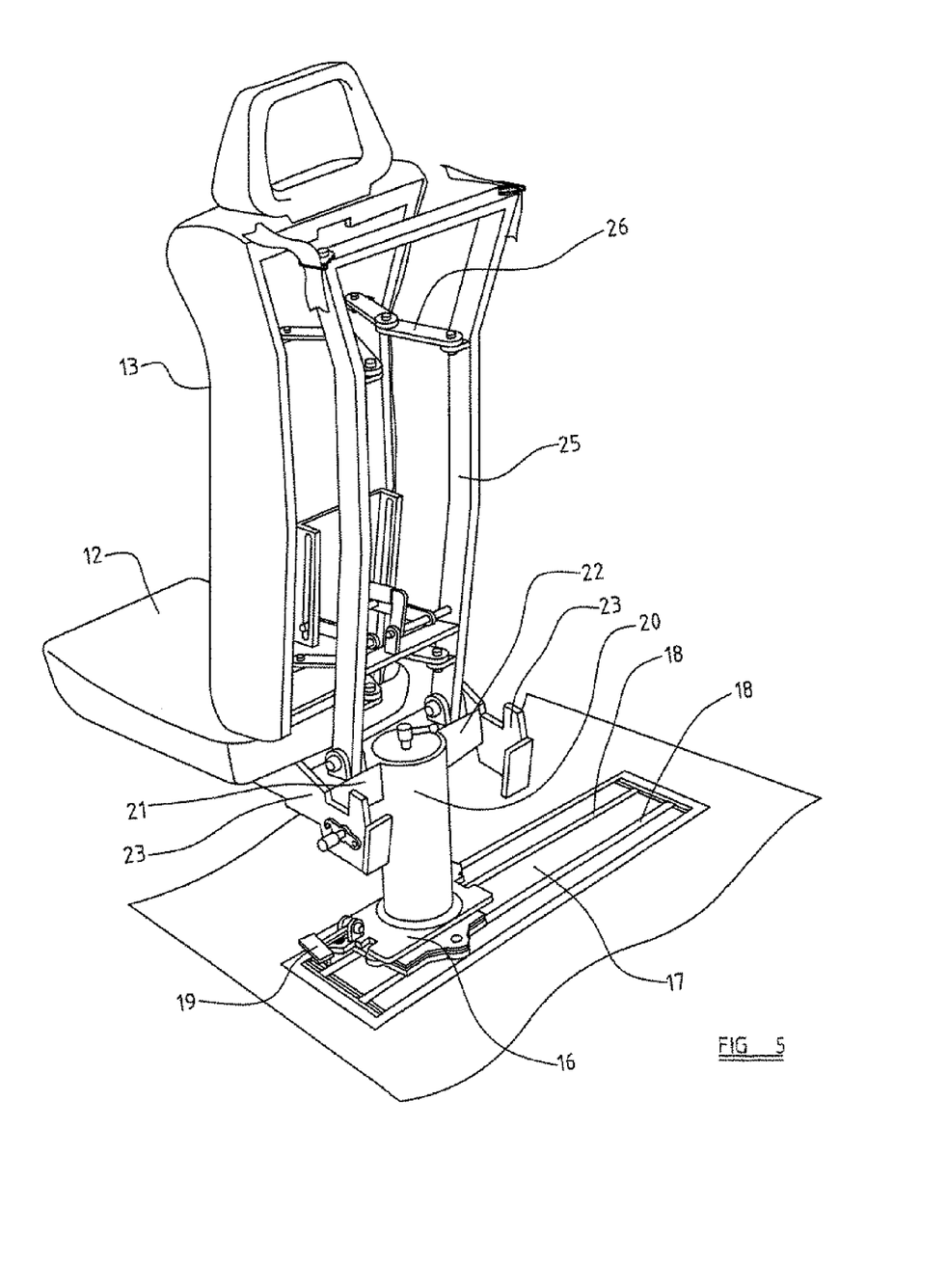
FIG. 5 is a rear perspective view of the seat of FIG. 4.

The seat 9 is shown, by way of example, in FIGS. 4 and 5. The seat shown is a seat similar to that described in British Patent Application No. 0509086.5 (Publication No.) although the seat has been simplified in some respects for use in the manner now contemplated.

The seat 9 comprises a squab 12 and a back-rest 13, the back-rest 13 being associated with two safety-belts 14, 15, which pass through shoulder guides provided at the top of the back-rest.

As can be seen more clearly from FIG. 5, the entire seat 9 is supported for lateral movement on a carriage 16. The carriage 16 is provided with depending dovetail formations engageable with corresponding dovetail grooves in a support plate 17. Rollers may be provided between the carriage 16 and the support plate 17 Protective bands 18 are provided which extend from the carriage 16 over the top of the dovetail grooves around guides at one end of the support platform 17 and back beneath the support platform to guides at the other end of the support platform, and thus back to the carriage 16 to provide protection against dirt or rubbish falling into the dovetail-shaped grooves.

A foot pedal actuated lock device 19 is provided to lock the carriage in any selected position.

The carriage 16 is provided with an upstanding support cylinder 20, and the main part of the seat is rotatably mounted to the carriage by the support cylinder 20. The upper part of the support cylinder is connected to two outwardly extending arms 21, 22 which each support a respective side plate 23, 24. The side plates 23, 24 support an upwardly extending back frame 25 and the seat-back 13 is connected to that frame by means of a linkage 26 so that the seat-back may move forward and rearward relative to the frame 25.

Figure 6:
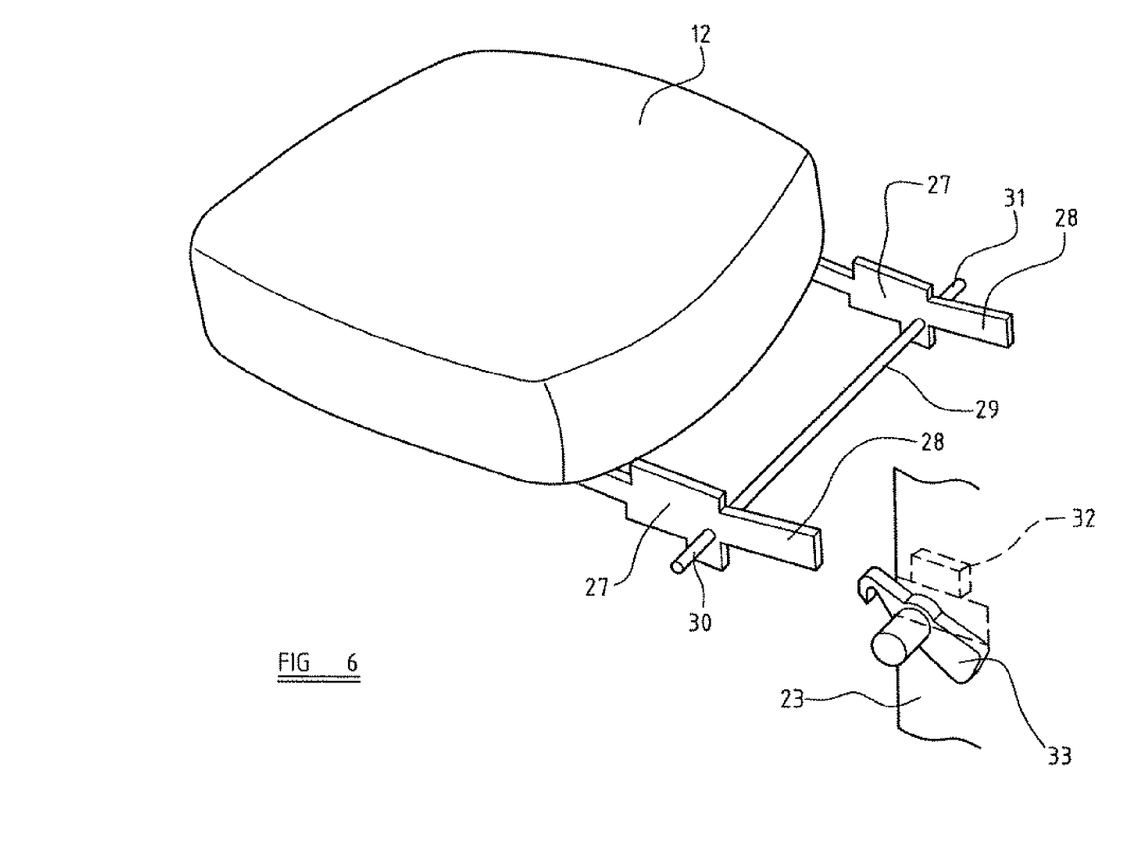
FIG. 6 is an isolated and enlarged perspective view of part of the seat of FIGS. 4 and 5.

The seat squab 12 is releasably connected to the side plates, as can be seen in FIG. 6. The squab 12 is provided with two rearwardly extending support arms 27, each support arm terminating with a rearwardly extending engagement finger 28. Extending laterally, relative to the support arms 27, is a transversely extending rod 29 having ends 30, 31 which project beyond the support arms 27. Seat-squab-finger engaging formations 32 are formed on the inner face of each side plate 23, and mounted on an exterior part of each side plate 23 is a hook unit 33. The fingers 28 of the squab 12 may be engaged with the formations 32, and the hooks 33 may be engaged with the projecting ends 30, 31 of the transverse rod 29 so that the seat squab is secured in position. The seat squab 12 may, however, readily be removed by releasing the hooks 33 and disengaging the fingers 28 from the formations 32.

It is thus to be appreciated that the seat 9 may initially be in an operative position in which the seat may be occupied by an able-bodied passenger.

However the squab 12 of the seat may be removed, the back-rest frame and the back-rest supported thereby may be rotated through 900 about the axis of the support cylinder 20, and the entire carriage 16 may then be moved laterally across the platform 17 to bring the back-rest to a position adjacent the side of the coach. When the seat 9 is in this condition a space is created between the seat 10 and the side of the coach.

A locking mechanism is provided to lock the components of the seat in position. The carriage 16 may be power driven, for example with a pneumatic drive.

Figure 7:
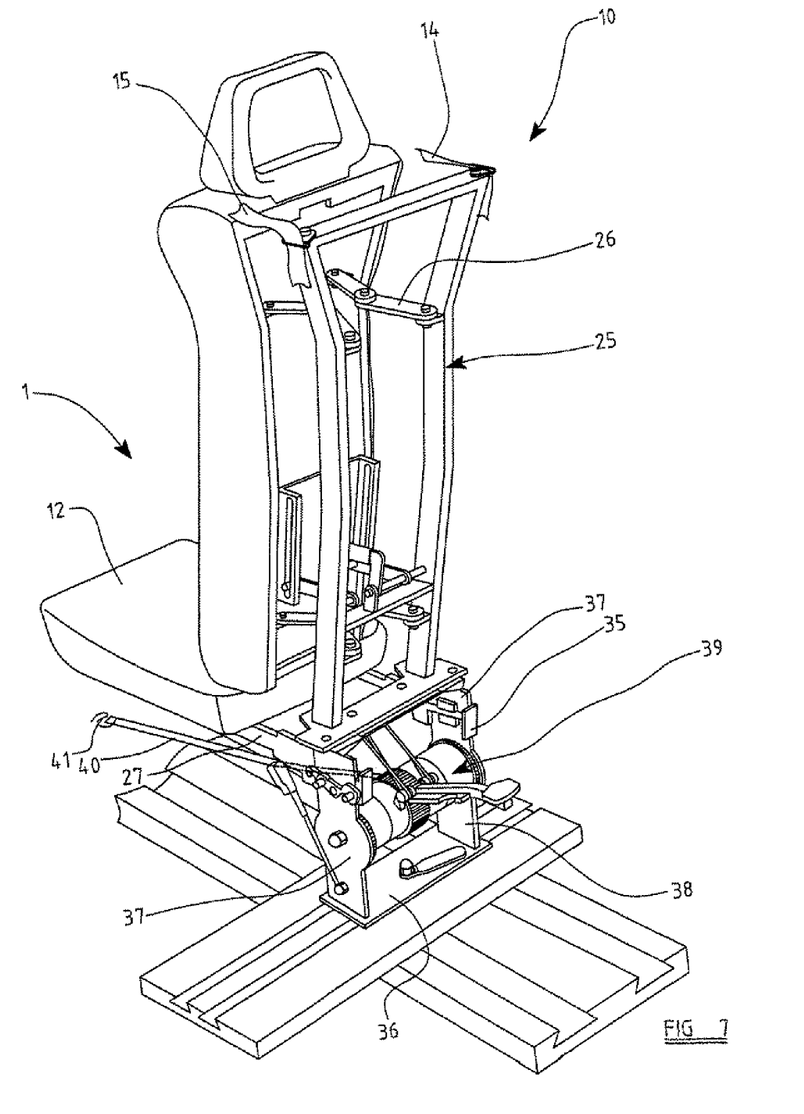
FIG. 7 is a rear perspective view of the other seat of the seating arrangement.

FIG. 7 illustrates the seat 10. The seat 10 has many features in common with the seat 9. The seat 10 is shown as being a seat as described and illustrated in WO 04/041,586 A, although a seat as described and shown in British Patent Application 0509086.5 (Publication No.) could be used instead. The seat 10 has a squab and a back-rest 13 as described with reference to the seat 9. Also in seat 10 the back-rest 13 is carried by a frame 25 by means of a linkage 26. The seat 10 is provided with two safety belts 14, 15, which pass through shoulder guides at the top of the back-rest.

The squab 12 of the seat 10 is removably mounted on a support structure 35.

In this embodiment the support structure does not permit rotation of the backrest about a vertical axis, but instead the support structure comprises a support platform 36 carrying two upstanding side plates 37. Seat squab finger-engaging formation 32 and hook units 33 as described above are provided on the side plates 37. A foot-pedal operated winch 39 extends between the side plates and is connected to a forward extending strap 40 which terminates with a hook 41 to engage a wheelchair. The side plates 37 carry buckles 38 for co-operation with the safety-belts.

The platform 36 (as can be seen more clearly in FIG. 8), is provided on its under-surface with two dovetailed shaped elongate shoes 42, 43. These shoes are received within corresponding laterally extending dovetail grooves 44, 45 provided in a transverse support plate 46. Rollers may be provided between the platform 36 and the support plate 46 to enable the platform 36 to move smoothly in a lateral direction.

Figure 8:
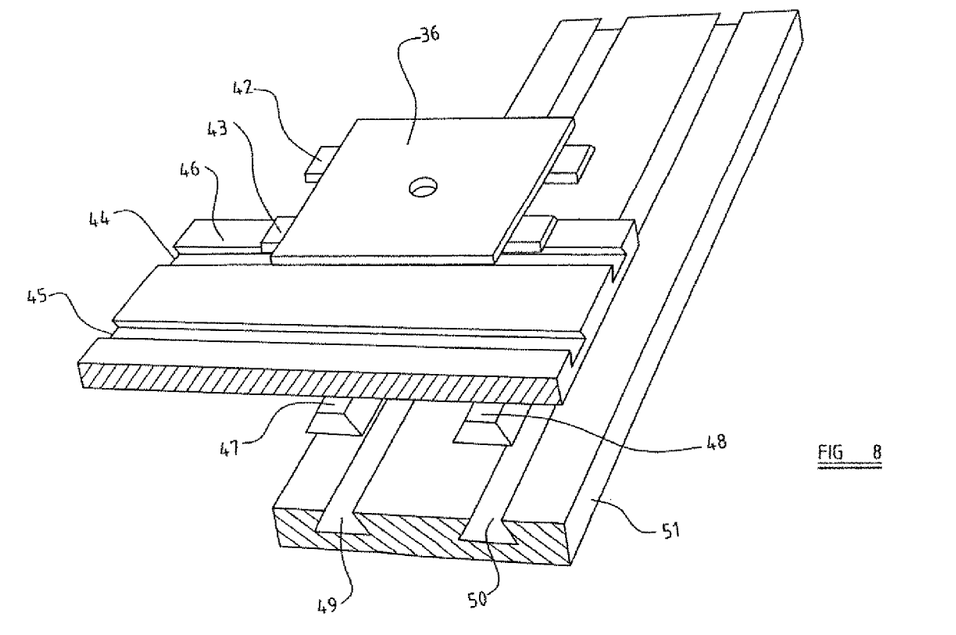
FIG. 8 is an enlarged exploded perspective view of the under-lying support of the seat shown in FIG. 7.

At one end thereof the transverse support plate 46 is itself provided with, on its under-surface, with dovetail shoes 47, 48. The shoes 47, 48 extend transversely or perpendicularly to the dovetail grooves 44,45. The shoes 47,48 are received within corresponding axially extending dovetail-shaped grooves 49, 50 provided in the upper surface of an axially extending support plate 51. Rollers may be provided between the transverse support plate 46 and the axially extending support plate 51 to enable the transverse support plate 46 to move axially.

It is to be understood that the actually extending support plate 51 will be mounted in the floor of the coach. The transverse support plate may slide axially of the bus or coach, being guided by the engagement of the dovetail shoes 47,48 within the dovetail grooves 49, 50. The support platform 36 may move in a lateral or transverse direction, by movement of the shoes 42, 43 within the dovetail grooves 44, 45. Thus the support platform 36 is mounted for axial and for lateral movement.

It is thus to be appreciated that the seat 10 as shown in FIG. 7 may be moved axially with respect to the vehicle and may also be moved transversely.

A locking mechanism is provided to lock the components of the seat in position. A drive, such as a pneumatic drive, may be provided to move the platform and the transverse support plate.

Thus, it is to be understood that whilst the seats 9 and 10 may have an initial condition in which they are in alignment with the "ordinary" seats provided in the coach, and are thus ready for use by able-bodied passengers, should a wheelchair user need to be transported by the coach initially the squab of the seat 9 may be removed, the back-rest may be rotated by 90° and the backrest may be moved adjacent the side of the vehicle to create a space on the side of the seat 10 remote from the aisle. The squab of the seat 10 may be removed and the back-rest of the seat may be moved laterally away from the aisle 6 towards the side of the vehicle, and then rearwardly until almost in contact with the row of seats behind, permitting a wheelchair to be located in front of the remaining part of the seat 10. The remaining part of the seat 10 may then be brought forward so that the back-rest 13 of the seat 10 engages the rear part of the back-rest of the wheelchair. The winch 39 may be used to winch the wheelchair up against the back-rest 13 and to hold the wheelchair in position. The occupier of the wheelchair will use and will thus be protected by the safety-belts 14, 15 and by the seat-back 13.

It is to be observed that the back-rest 13 has a relatively broad portion at shoulder height, to ensure that the seat-belt are guided appropriately across a wheelchair user (or an ordinary occupant of the seat) and the lower part of the seat-back is of a lesser width, to ensure that this part of the seat-back will pass between the handles provided on a wheelchair. The position of the seat-back 13 may be adjusted relative to the frame by means of the linkage 26, to ensure that the seat-back is firmly in engagement with the rear part of the wheelchair and also to enable the seat-back to be moved forward to engage the rear part of the wheelchair if the wheelchair is an electric wheelchair of the type having a protruding housing to the rear of the wheelchair between the wheels.

While, in the embodiment of FIGS. 7 and 8, one arrangement is provided to enable the seat to move laterally and axially, it is to be appreciated that alternative arrangements are possible.

Figure 9:
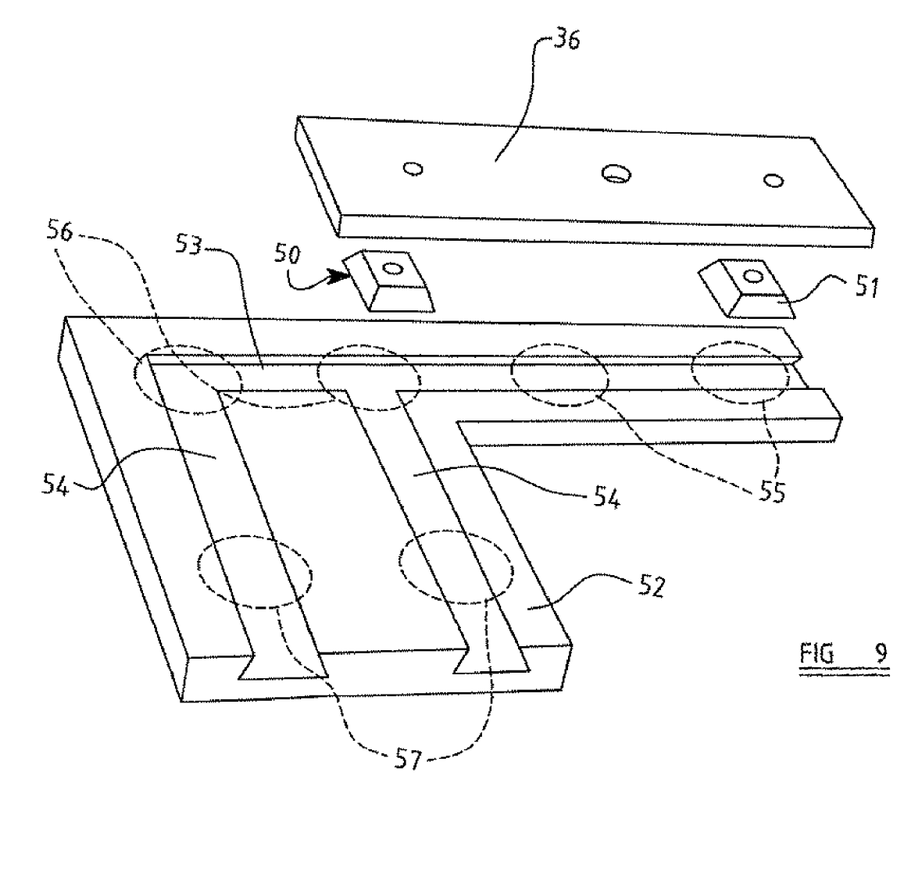
FIG. 9 is an enlarged exploded perspective view of an alternative form of support.

For example, as shown schematically in FIG. 9, the lower surface of the support platform 36 may be provided with two square dovetail elements 50, 51, and a track unit 52 may be provided, the track unit defining a single laterally extending dovetail groove 53, and two axially extending dove-shaped channels 54 which engage with the groove 53, somewhat resembling the letter "F". The support plate 36 may initially be positioned with the two dovetail elements 50, 51 in the laterally extending groove 53, as indicated by the dotted circles 55. The support plate 36 may be moved to the left, as shown in FIG. 9, until the dovetail-shaped elements 50, 51 are located in the regions identified by the dotted circles 56, in which they are in alignment with the axially extending dovetail channels 54. The support plate 36 may then be moved axially along the dovetail channels 54 until the dovetail elements 50, 51 occupy the positions indicated by the dotted circles 57. Thus, in the arrangement shown in FIG. 9, it is again possible to move the seat laterally and axially.

It is desirable always to move a wheelchair, with a wheelchair occupant, forward. It is envisaged that it may be difficult to maneuver a wheelchair into position in the relatively confined space available within a coach.

Figure 10:
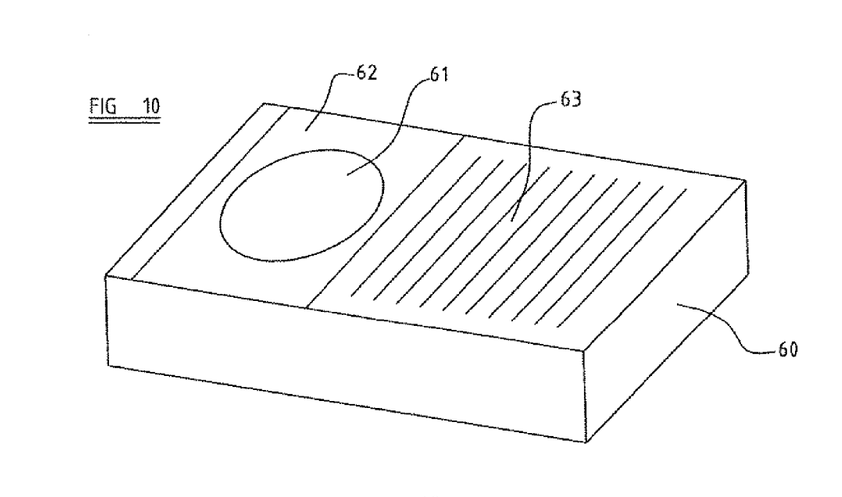
FIG. 10 is a perspective view of a turntable box to be mounted in the floor of the bus or coach.
Figure 11:
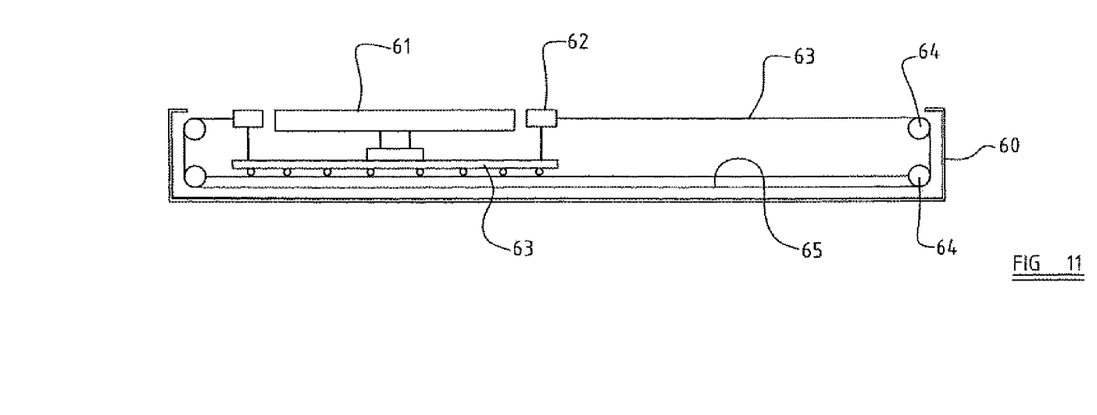
FIG. 11 is a cross-sectional view of the turntable box.

Consequently it is therefore now proposed that a turntable unit should be provided mounted in the floor of the coach. FIGS. 10 and 11 illustrate turntable unit.

The illustrated turntable unit comprises a housing 60. Mounted within the housing 60 is a turntable 61 having an upper surface flush with the upper surface of the housing 60. The turntable is surrounded by a fixed surround 62. The turntable is dimensioned so that the turntable initially may be in the aisle of the bus or coach adjacent the final position to be occupied by a wheelchair user, with the upper part of the turntable unit flush with the surrounding floor.

As can be seen from FIG. 11, the turntable 61 and the surround 62 are mounted on a carriage 63 provided with rollers to enable the carriage to move transversely within the housing 60. A roller shutter 63 is provided extending from the opposed sides of the surround 62 to the ends of the housing 60. As shown in FIG. 11 the roller shutter 63 may be an endless roller shutter extending around rollers 64 within the housing to pass beneath a platform 65 within the housing which supports the carriage 63. Alternatively, two roller shutters may be provided, one on either side of the surround 62, each being accommodated on its own individual roller.

It is envisaged that the described unit will be floor-mounted, extending across the aisle of the vehicle and extending to the space immediately in front of the seat 10 when the seat 10 is in position to receive a wheelchair. Initially, of course, all of the components of the assembly will be locked firmly in position, and the roller shutter will simulate the ordinary floor of the vehicle, so that the entire unit is very unobtrusive. The turntable may be provided with a drive, such as a pneumatic drive, to rotate the turntable and to move the turntable laterally.

When the turntable unit is to be used by a wheelchair user, initially the wheelchair user is brought into the bus by using the lift mechanism associated with the stairs 3 and by using the lift platform 4 so that the wheelchair occupant is brought to the level of the aisle of the coach, facing rearwardly.

The wheelchair user is then wheeled along the aisle until the wheelchair user is on the turntable 61. The turntable may be moved slightly towards the seat to be occupied by the wheelchair user and the wheelchair user may then be rotated through 180° so as to be facing forward. The turntable may then be moved laterally of the vehicle to a final position in which the wheelchair user is in alignment with the seat 10. The turntable will then be locked in position.

The seat 10 may then be brought forward to engage the back-rest of the wheelchair. The safety straps provided on the back-rest may be applied to the occupant of the wheelchair and also the wheelchair may be "winched" into position by the winch provided on the seat 10. The wheelchair user is thus securely held in position. The seat-belts will provide protection in case of a frontal impact of the coach, and should a rear impact occur, the presence of the back-rest immediately adjacent the back of the wheelchair occupant will provide an added degree of safety.

Whilst, in the foregoing described embodiments, the inboard seat 9 has been of a specific type, it is to be appreciated that many modifications may be effected to that seat 9. Indeed, the seat 9 could simply be a "ordinary" seat, which is mounted for quick-release enabling the seat to be removed entirely from the coach, when a wheelchair occupant is to be transported. The seat 9, however, should be of such a design that the seat can readily be maneuvered to a position in which the seat enables the seat 10 to be moved in a direction towards the side wall of the coach, so that the seat 10 is off-set from the aisle, so that a wheelchair, when in contact with the back-rest, does not obstruct the aisle of the bus or coach.

When used in this Specification and Claims, the terms "comprises" and "comprising" and variations thereof mean that the specified features, steps or integers are included. The terms are not to be interpreted to exclude the presence of other features, steps or components.

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

I claim:

1. A seating arrangement for a vehicle, said seating arrangement comprising:
   two adjacent seats being a first seat and a second seat, said first seat positioned adjacent a side of the vehicle, said second seat positioned adjacent an aisle of the vehicle, said first seat adjacent the side of the vehicle being adapted to be moved from a first operative position to a second position in which a substantial clear space exists on a side of the second seat which is remote from the aisle, the second seat having a seat squab moveable to a position in which the seat squab does not obstruct the space in front of a back-rest of the second seat, the second seat being moveable laterally towards the side of the vehicle and axially of the vehicle.

2. A seating arrangement according to claim 1, the seats being mounted in a vehicle in the form of a bus or coach.

3. A seating arrangement according to claim 1, wherein the first seat is a seat removably mounted in position.

4. A seating arrangement according to claim 1, wherein the first seat is provided with a squab moveable to a position in which the squab does not obstruct the space in front of a back-rest of said first seat, the back-rest of said first seat being moveable laterally towards the side of the vehicle and also being mounted for rotational movement about a substantially vertical axis, to enable the back-rest to be located in position adjacent the side of the vehicle, to define said substantial clear space, the substantial clear space being located between the back-rest of the first seat and the second seat.

5. A seating arrangement according to claim 1, wherein the squab of the second seat is removable from the back-rest of the second seat.

6. A seating arrangement according to claim 1, wherein the back-rest of the second seat is provided with two safety-belts, each safety-belt passing through a respective shoulder guide of the back-rest of the second seat.

7. A seating arrangement according to claim 1, wherein said second seat is mounted on a platform, said platform being mounted on a transverse support plate to effect lateral movement, said transverse support plate being mounted on an axially extending support plate for axial movement.

8. A seating arrangement according to claim 7, wherein said platform is provided with two elongate shoes on an under-surface thereof, the shoes being received within corresponding laterally extending grooves provided in said transverse support plate.

9. A seating arrangement according to claim 7, wherein said transverse support plate is provided with axially extending shoes, the shoes being received within axially extending grooves provided in the support plate.

10. A seating arrangement according to claim 1, wherein said second seat is supported on a support plate, said support plate having a support platform having at least one element engaging a groove and channel arrangement formed in a track unit, the at least one groove and channels defining at least one laterally extending groove and at least one axially extending channel, the element being slideably retained within the groove and channel to effect lateral and axial movement.

11. An apparatus comprising:
a housing;
a turntable positioned within said housing;
a turntable surround surrounding said turntable within said housing;
a carriage means supporting said turntable and said turntable surround within said housing, said carriage means for effecting lateral movement of said turntable and said turntable surround within said housing; and
a roller-shuttle connected to said turntable surround so as to provide a simulated floor surface adjacent said turntable surround.

12. The apparatus of claim 11, further comprising:
a seating arrangement positioned on said turntable, said seating arrangement suitable for use by a wheelchair user.

13. The apparatus of claim 11, further comprising:
a vehicle having a side and an aisle; and
a seating arrangement positioned on said turntable and said vehicle, said seating arrangement having a first seat adjacent a second seat, said first seat being positioned adjacent said side of said vehicle, said first seat being movable between a first position to a second position, said second seat being positioned adjacent said aisle of said vehicle, said second seat having a seat squab movable to a position in which said seat squab does not obstruct a space in front of a backrest of said second seat, said second seat being movable laterally toward a side of said vehicle and axially of said vehicle.

* * * * *